(12) United States Patent
Tsao et al.

(10) Patent No.: US 8,086,824 B2
(45) Date of Patent: Dec. 27, 2011

(54) STREAM PROCESSING SYSTEM HAVING A RECONFIGURABLE MEMORY MODULE

(75) Inventors: You-Ming Tsao, Taipei (TW);
Liang-Gee Chen, Taipei (TW); Shao-Yi Chien, Taipei (TW)

(73) Assignee: National Taiwan University (TW)

( * ) Notice: Subject to any disclaimer, the term of this patent is extended or adjusted under 35 U.S.C. 154(b) by 287 days.

(21) Appl. No.: 12/436,031

(22) Filed: May 5, 2009

(65) Prior Publication Data
US 2010/0115238 A1    May 6, 2010

(30) Foreign Application Priority Data

Nov. 6, 2008    (TW) ................................ 97142837 A

(51) Int. Cl.
*G06F 15/00*    (2006.01)
*G06F 15/76*    (2006.01)

(52) U.S. Cl. .......................................... 712/16; 712/10
(58) Field of Classification Search ........................ None
See application file for complete search history.

(56) References Cited

OTHER PUBLICATIONS

Suh et al.; Dynamic Cache Partitioning for Simultaneous Multithreading Systems; Aug. 2001.*
Iyer et al.; QoS Policies and Architecture for Cache/Memory in CMP Platforms; 2007.*
Kim et al.; Fair Cache Sharing and Partitioning in a Chip Multiprocessor Architecture; 2004.*

* cited by examiner

*Primary Examiner* — Eddie P Chan
*Assistant Examiner* — Corey S Faherty
(74) *Attorney, Agent, or Firm* — Baker & McKenzie LLP

(57) ABSTRACT

A stream processing system includes a stream processing module coupled to a memory module and operable so as to fetch stream elements from the memory module, to process the stream elements fetched thereby, and to store processed stream elements in the memory module. The stream processing module includes a number (N) of stream processing units, and the memory module is configured with a number (N) of memory bank units each corresponding to a respective one of the stream processing units. The memory module is reconfigurable based on a desired inter-level configuration so that each of the memory bank units is configured to have a memory size sufficient to meet processing requirement of the respective one of the stream processing units.

7 Claims, 7 Drawing Sheets

STREAM PROCESSING SYSTEM HAVING A RECONFIGURABLE MEMORY MODULE

CROSS-REFERENCE TO RELATED APPLICATION

This application claims priority of Taiwanese Application No. 097142837, filed on Nov. 6, 2008.

BACKGROUND OF THE INVENTION

1. Field of the Invention

The invention relates to a stream processing system, more particularly to a stream processing system having a reconfigurable memory module.

2. Description of the Related Art

FIG. 1 illustrates a conventional pipelined stream processing system 10 that includes a number (N) of stream processing units 11, and a number (N+1) of first-in first-out (FIFO) stream fetching units 13. However, the conventional pipelined stream processing system 10 requires a large external bandwidth and may encounter pipeline unbalance, thereby adversely affecting performance and hardware utilization thereof.

FIG. 2 illustrates a graphic application embodied in the conventional pipelined stream processing system 10, wherein N=3 and the stream processing units 11 are used to perform geometry stream processing, geometry-to-pixel processing and pixel stream processing, respectively. It is noted that, when an input speed of vertex data to an input vertex buffer 20 is slower than a processing speed of the stream processing unit 11 for geometry stream processing, the whole system 10 is idle to wait for stream data feeding. In addition, two stream processing units 11 are required for processing from a geometry stage to a pixel stage. Therefore, it is difficult to find optimized stream fetching between the geometry stage and the pixel stage.

A conventional vertex cache has been proposed to reduce a memory bandwidth of a 3D graphic processor, wherein a pre-TnL cache can prevent transfer of extra vertex data when the latter has already been stored therein, and processed vertex results can be reused in a post-TnL cache. The pre-TnL cache needs to prefetch a number of consecutive vertex data using a burst mode. Conventionally, the pre-TnL cache organizes 32 entries into 8 slots replaced by new data in a FIFO manner upon cache miss. The post-TnL cache holds 16 entries, which are divided into 4 slots replaced in the FIFO manner. Both the pre-TnL and post-TnL caches use a 16-bit index to identify whether corresponding data is fetched or processed. The size of input/output vertex data can be changed as required. However, each buffer in the conventional vertex cache is designed to be dedicated, and the memory size of the same is determined based on the worst case. As a result, the conventional vertex cache may result in huge waste in memory space when used in other applications.

SUMMARY OF THE INVENTION

Therefore, an object of the present invention is to provide a stream processing system having a reconfigurable memory module that can overcome the aforesaid drawbacks of the prior art.

According to the present invention, a stream processing system comprises:

a memory module; and a stream processing module coupled to the memory module and operable so as to fetch stream elements from the memory module, to process the stream elements fetched thereby, and to store processed stream elements in the memory module.

The stream processing module includes a number (N) of stream processing units, and the memory module is configured with a number (N) of memory bank units each corresponding to a respective one of the stream processing units.

The memory module is reconfigurable based on a desired inter-level configuration so that each of the memory bank units is configured to have a memory size sufficient to meet processing requirement of the respective one of the stream processing units.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
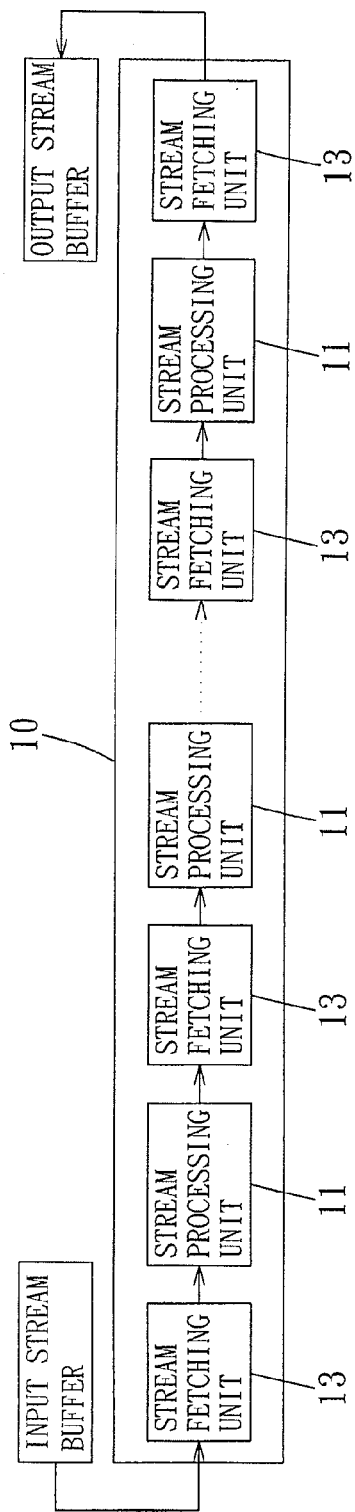
FIG. 1 is a schematic circuit block diagram illustrating a conventional pipelined stream processing system.
Figure 2:
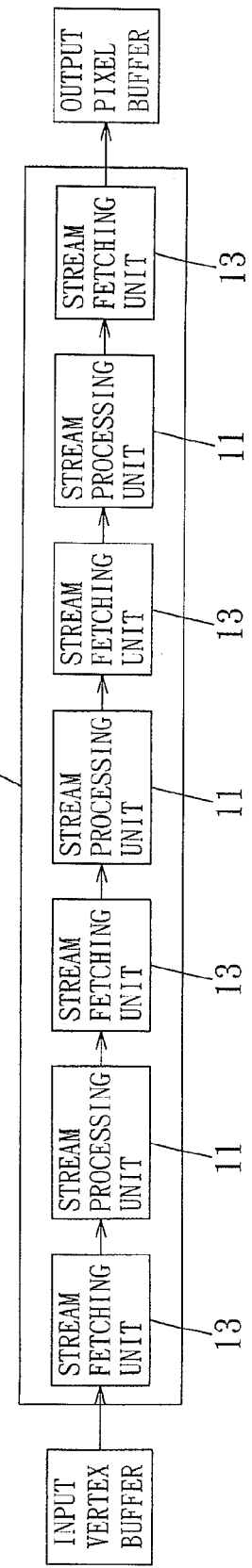
FIG. 2 is a schematic circuit block diagram illustrating a graphic application embodied in the conventional pipelined stream processing system.
Figure 3:
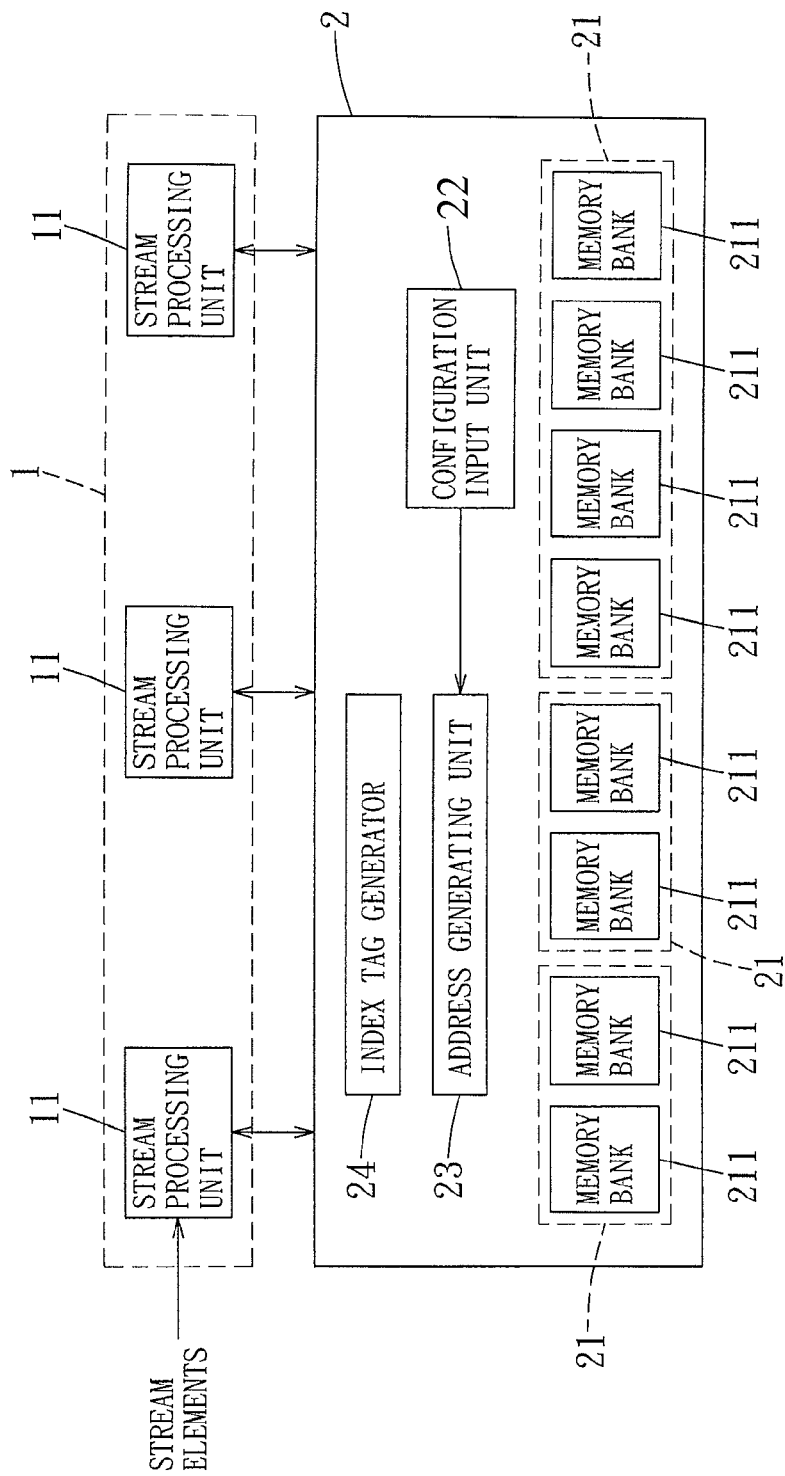
FIG. 3 is a schematic circuit block diagram illustrating the preferred embodiment of a stream processing system according to the present invention.

Referring to FIG. 3., the preferred embodiment of a multithreading stream processing system according to the present invention is shown to include a stream processing module 1 and a memory module 2.

Figure 7:
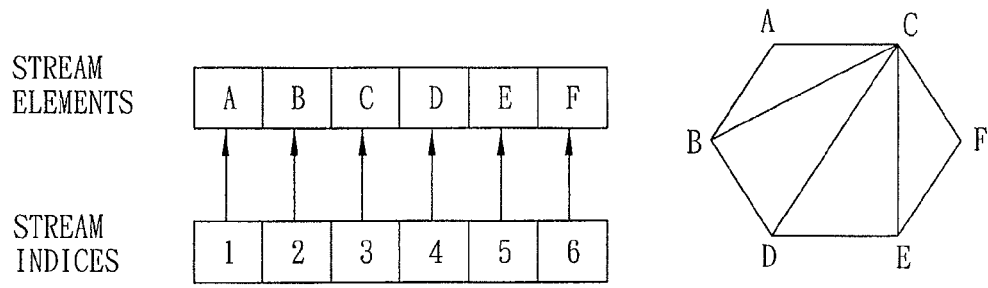
FIG. 7 is a schematic diagram illustrating an example where stream elements processed in the preferred embodiment are data of vertices of a graphic polygon object and where each of the stream elements is configured with a specific stream index.

The stream processing module 1 is coupled to the memory module 2 so as to fetch stream elements from the memory module 2, to process the stream elements fetched thereby, and to store processed stream elements in the memory module 2. The stream processing module 1 includes a number (N) of stream processing units 11. In this embodiment, N is equal to 3, and the stream processing system is applied for graphic processing. Thus, a first one of the stream processing units 11 receives stream elements from an external device (not shown), and is used to perform geometry stream processing. A second one of the stream processing units 11 is used to perform geometry-to-pixel processing. A third one of the stream processing units 11 is used to perform pixel stream processing. In this embodiment, the stream elements are image stream data, such as data of vertices of a graphic polygon object. Each of the stream elements is configured with a specific stream index. For example, as shown in FIG. 7, data of vertices (A, B, C, D, E, F) of a graphic hexagon object can serve as the stream elements each configured with the specific stream index (1, 2, 3, 4, 5, 6). In other embodiments, the stream elements can be video stream data or audio stream data.

The memory module 2 is configured with a number (N) of memory bank units 21 each corresponding to a respective one of the stream processing units 11. The memory module 2 is reconfigurable based on a desired inter-level configuration so that each of the memory bank units 21 is configured to have a memory size sufficient to meet processing requirement of the respective one of the stream processing units 11. In this embodiment, each of the memory bank units 21 includes a set of memory banks 211. The memory module 2 further includes a configuration input unit 22, an address generating unit 23, and an index tag generator 24.

Figure 4:
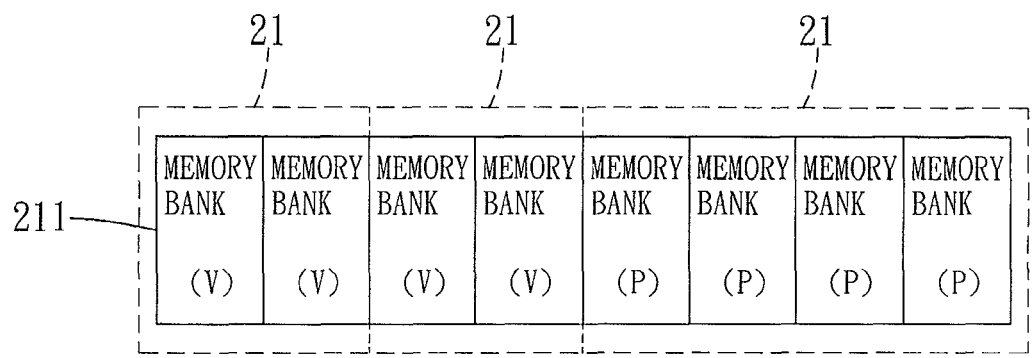
FIG. 4 is a schematic diagram illustrating an embodiment of three memory bank units of a memory module of the preferred embodiment.
Figure 5:
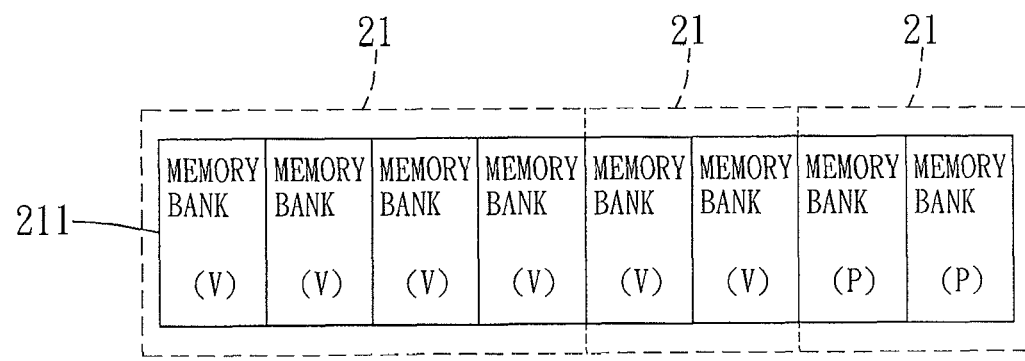
FIG. 5 is a schematic diagram illustrating another embodiment of the memory bank units of the memory module of the preferred embodiment.
Figure 6:
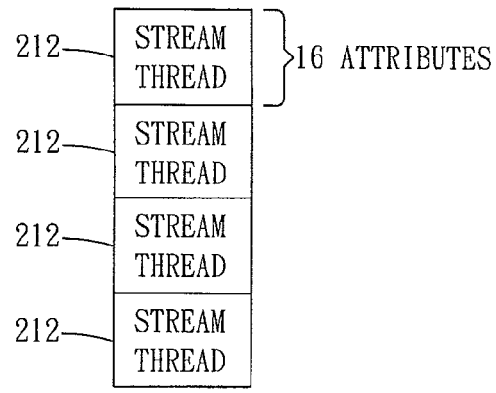
FIG. 6 is a schematic diagram illustrating an embodiment of a memory bank of the memory module of the preferred embodiment.

The configuration input unit 22 is operable so as to generate a first output corresponding to the desired inter-level configuration such that the number of the memory banks 211 of each of the memory bank units 21 is determined based on the first output generated by the configuration input unit 22. In this embodiment, according to the desired inter-level configuration, a first one of the memory bank units 21 corresponding to the first one of the stream processing units 11 is configured to have two memory banks 211 for storage of vertex stream data, a second one of the memory bank units 21 corresponding to the second one of the stream processing units 11 is configured to have two memory banks 211 for storage of vertex stream data, and a third one of the memory bank units 21 corresponding to the third one of the stream processing units 11 is configured to have four memory banks 211 for storage of pixel stream data, as shown in FIG. 4. In another embodiment, as shown in FIG. 5, the first one of the memory bank units 21 can be configured to have four memory banks 211 for vertex stream data, the second one of the memory units 21 can be configured to have two memory banks 211 for vertex stream data, and the third one of the memory bank units 21 can be configured to have two memory banks 211 for pixel stream data. The configuration input unit 22 is further operable so as to generate a second output corresponding to a desired intra-level configuration such that each of the memory banks 211 of each of the memory bank units 21 is configured with a desired number of stream threads based on the second output generated by the configuration input unit 22. Preferably, memory sizes of the stream threads 212 configured for a same one of the memory banks 211 are the same. In this embodiment, according to the desired intra-level configuration, each memory bank 211 of each memory bank unit 21 is configured with four stream threads 212 each having 16 attributes, as shown in FIG. 6. In other embodiments, the memory bank units 21 can be configured according to different inter-level configurations and different intra-level configurations, as shown in Table 1.

TABLE 1

| Memory bank configuration | Stream thread capacity |
| --- | --- |
| 4V4P | 8V8P |
|  | 8V16P |
|  | 16V8P |
| 6V2P | 12V4P |
|  | 12V8P |

The address generating unit 23 is coupled to the configuration input unit 22 for receiving the first and second outputs from the configuration input unit 22, and for generating addresses corresponding to the stream elements to be fetched from and to be stored in the memory module 2 based on the first and second outputs received thereby.

Figure 8:
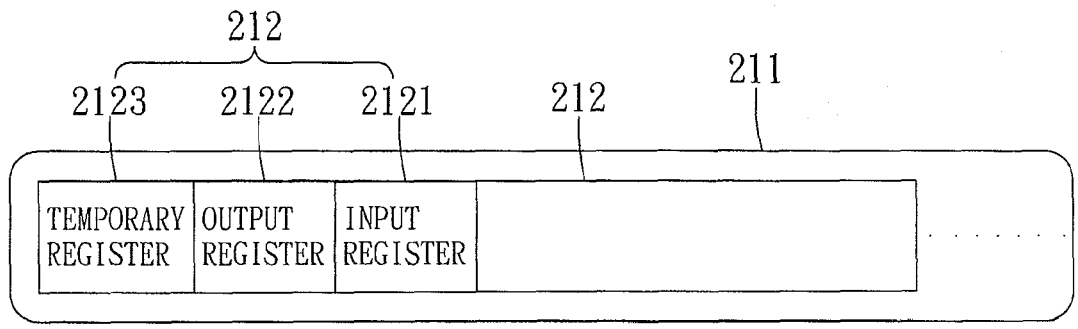
FIG. 8 is a schematic diagram illustrating the memory bank of the preferred embodiment, wherein each of stream threads of the memory bank includes an input register, an output register and a temporary register.

It is noted that, as shown in FIG. 8, each of the stream threads 212 of the memory banks 211 of the memory bank units 21 includes an input register 2121 for storing the stream elements fetched by the respective one of the stream processing units 11 and to be processed by the respective one of the stream processing units 11, an output register 2122 for storing the processed stream elements from the respective one of the stream processing units 11, and a temporary register 2123.

Figure 9:
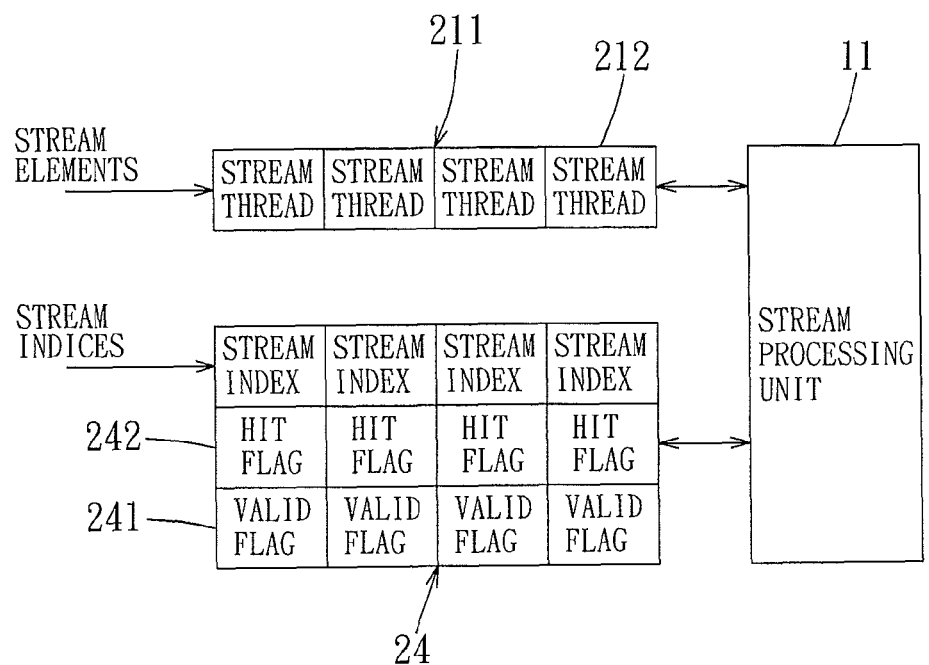
FIG. 9 is a schematic diagram illustrating the memory bank, an index tag generator and a stream processing unit of the preferred embodiment.

The index tag generator 24 is configured for at least one of the memory banks 211 of the memory bank units 21. Referring to FIG. 9, the index tag generator 24 receives the stream indices of the stream elements to be stored in the input registers 2121 of the stream threads 212 of the at least one of the memory banks 211 of the memory bank units 21, and generates information associated with the stream elements to be processed by the respective one of the stream processing units 11. The information generated by the index tag generator 24 includes a plurality of valid flags 241 corresponding respectively to the stream indices received by the index tag generator 24, and a plurality of hit flags 242 corresponding respectively to the stream indices received by the index tag generator 24. Each of the valid flags 241 indicates whether the stream element having a corresponding one of the stream indices is stored in the input register 2121 of a corresponding one of the stream threads 212 of the at least one of the memory banks 211 of the memory bank units 21. Each of the hit flags 242 indicates whether the output register 2122 of a corresponding one of the stream threads 212 of the at least one of the memory banks 211 of the memory bank units 21 is stored with the processed stream element from the respective one of the stream processing units 11. In this embodiment, the information includes four valid flags 241 and four hit flags 242. The stream elements from the at least one of the memory banks 211 of the memory bank units 21 are processed by the respective one of the stream processing units 11 based on the valid flags 241 and the hit flags 242 from the index tag generator 24.

Figure 10:
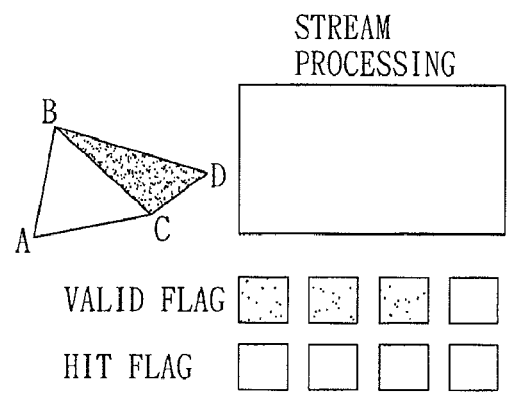
FIGS. 10 to 13 are schematic diagrams illustrating how a graphic four-sided object is processed based on valid flags and hit flags generated by the index tag generator of the preferred embodiment.
Figure 11:
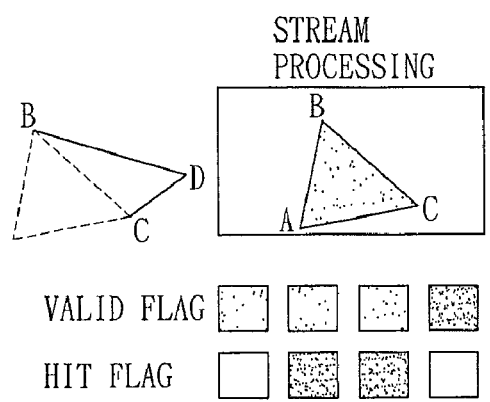
Figure 12:
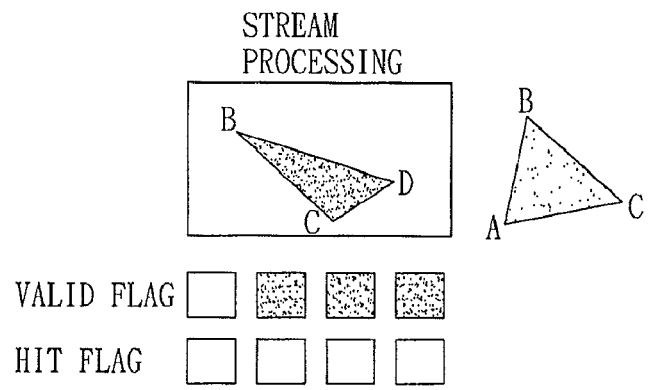
Figure 13:
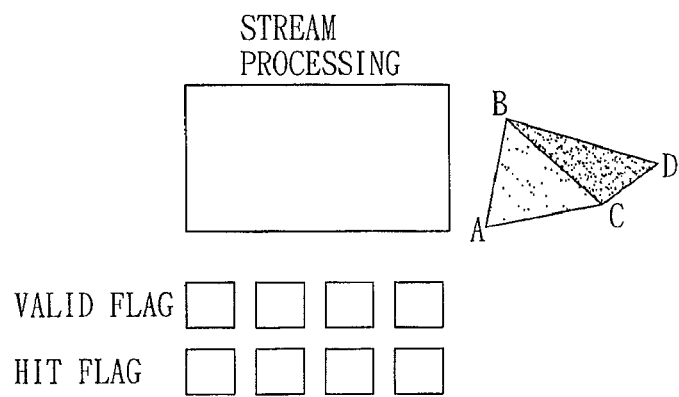

FIGS. 10 to 13 illustrate how a graphic four-sided object is processed based on the valid flags 241 and the hit flags 242 generated by the index tag generator 24. The graphic four-sided object has vertices (A, B, C, D). In FIG. 10, three of the valid flags 241 indicate that three stream elements corresponding to data of vertices (A, B, C) of a first triangular portion of the graphic four-sided object are respectively stored in the input registers 2121 of the corresponding ones of the stream threads 212 of one memory bank 211, and each hit flag 242 indicates that the output register 2122 of each stream thread 212 of said one memory bank 211 is not stored with the processed stream element from a corresponding stream processing unit 11. In FIG. 11, the corresponding stream processing unit 11 processes the stream elements corresponding to the data of the vertices (A, B, C) of the first triangular portion of the graphic four-sided object. A remaining one of the valid flags 241 indicates that a stream element corresponding to data of a vertex (D) of the graphic four-sided object is stored in a corresponding one of the stream threads 212 of said one memory bank 211 such that the stream elements corresponding to data of vertices (B, C, D) of a second triangular portion of the graphic four-sided object are to be processed by the corresponding stream processing unit 11. Since the vertices (B, C) are common to the first and second triangular portions, two of the hit flags 242 indicate that the output registers 2122 of the corresponding two of the stream threads 212 of said one memory bank 211 are respectively stored with the processed stream elements from the corresponding stream processing unit 11. In FIG. 12, after the processed stream elements corresponding to the first triangular portion of the graphic four-sided object are fetched by a next-stage stream processing unit 11, the corresponding stream processing unit 11 processes the stream elements corresponding to the data of the vertices (B, C, D) of the second triangular portion of the graphic four-sided object using the processed stream elements stored in the output registers 2122 of the corresponding two of the stream threads 212 of said one memory bank 211. In FIG. 13, after the processed stream elements corresponding to the second triangular portion of the graphic four-sided object are fetched by the next-stage stream processing unit 11, the valid flags 241 and the hit flags 242 are cleared. Due to the presence of the index tag generator 24, stream index caching can be achieved, thereby reducing the external bandwidth. Furthermore, since the hit rate is up to 66% during graphic processing, the performance of the stream processing system can be enhanced.

In sum, the memory bank units 21 are reconfigurable based on the desired inter-level configuration and the desired intra-level configuration. Therefore, the stream processing system of the present invention can provide optimized hardware utilization, thereby achieving pipeline balance.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A stream processing system comprising:
    a memory module; and
    a stream processing module coupled to said memory module and operable so as to fetch stream elements from said memory module, to process the stream elements fetched thereby, and to store processed stream elements in said memory module;
    wherein said stream processing module includes a number (N) of stream processing units, said memory module is configured with a number (N) of memory bank units each corresponding to a respective one of said stream processing units, and each of said memory bank units includes a set of memory banks; and
    wherein said memory module further includes a configuration input unit operable to generate a first output and a second output, wherein the first output is corresponding to a desired inter-level configuration such that the number of said memory banks of each of said memory bank units is determined based on the first output, and said memory module is reconfigurable based on the desired inter-level configuration so that each of said memory bank units is configured to have a memory size sufficient to meet processing requirement of the respective one of said stream processing units, and the second output is corresponding to a desired intra-level configuration such that each of said memory banks of each of said memory bank units is configured with a desired number of stream threads based on the second output generated by said configuration input unit.

2. The stream processing system as claimed in claim 1, wherein each of the stream elements includes image stream data.

3. The stream processing system as claimed in claim 1, wherein each of the stream elements includes video stream data.

4. The stream processing system as claimed in claim 1, wherein each of the stream elements includes audio stream data.

5. The stream processing system as claimed in claim 1, wherein memory sizes of the stream threads configured for a same one of said memory banks are the same.

6. The stream processing system as claimed in claim 1, wherein said memory module further includes an address generating unit coupled to said configuration input unit for receiving the first and second outputs from said configuration input unit, and for generating addresses corresponding to the stream elements to be fetched from and to be stored in said memory module based on the first and second outputs received thereby, said stream processing module fetching the stream elements from and storing the processed stream elements in said memory module according to the addresses generated by said address generating unit.

7. The stream processing system as claimed in claim 6, wherein:
    each of the stream elements is configured with a specific stream index; each of said stream threads of said memory banks of said memory bank units includes an input register for storing the stream elements fetched by the respective one of said stream processing units and to be processed by the respective one of said stream processing units, and an output register for storing the processed stream elements from the respective one of said stream processing units; said memory module further includes an index tag generator configured for at least one of said memory banks of said memory bank units,
    said index tag generator receiving the stream indices of the stream elements to be stored in said input registers of said stream threads of the at least one of said memory banks of said memory bank units, and generating information associated with the stream elements to be processed by the respective one of said stream processing units;
    wherein the information generated by said index tag generator includes:
        a plurality of valid flags corresponding respectively to the stream indices received by said index tag generator, each of the valid flags indicating whether the stream element having a corresponding one of the stream indices is stored in said input register of a corresponding one of said stream threads of the at least one of said memory banks of said memory bank units, and
        a plurality of hit flags corresponding respectively to the stream indices received by said index tag generator, each of the hit flags indicating whether said output register of a corresponding one of said stream threads of the at least one of said memory banks of said memory bank units is stored with the processed stream element from the respective one of said stream processing units; and
    wherein the stream elements from the at least one of said memory banks of said memory bank units are processed by the respective one of said stream processing units based on the valid flags and the hit flags from said index tag generator.

* * * * *